United States Patent
Castonguay

(10) Patent No.: US 9,835,192 B2
(45) Date of Patent: Dec. 5, 2017

(54) BREAKAWAY PRESSURE SCREW

(71) Applicant: Hubbell Incorporated, Shelton, CT (US)

(72) Inventor: Kevin Normand Castonguay, Weare, NH (US)

(73) Assignee: Hubbell Incorporated, Shelton, CT (US)

( * ) Notice: Subject to any disclaimer, the term of this patent is extended or adjusted under 35 U.S.C. 154(b) by 92 days.

(21) Appl. No.: 14/872,386

(22) Filed: Oct. 1, 2015

(65) Prior Publication Data

US 2016/0097417 A1   Apr. 7, 2016

Related U.S. Application Data

(60) Provisional application No. 62/058,307, filed on Oct. 1, 2014.

(51) Int. Cl.
| | |
|---|---|
| *F16B 31/00* | (2006.01) |
| *F16B 31/02* | (2006.01) |
| *H01R 4/36* | (2006.01) |

(52) U.S. Cl.
CPC ............. *F16B 31/021* (2013.01); *H01R 4/36* (2013.01)

(58) Field of Classification Search
CPC . H01R 4/36; H01R 4/366; F16B 31/00; F16B 31/021; F16B 31/02
USPC .......... 439/814, 798, 812, 801; 29/863, 857; 411/2, 4
See application file for complete search history.

(56) References Cited

U.S. PATENT DOCUMENTS

| | | | |
|---|---|---|---|
| 2,830,635 | A | 4/1958 | Thorstens |
| 3,498,174 | A | 3/1970 | Schuster |
| 3,622,946 | A | 11/1971 | Rogers |
| 3,865,007 | A | 2/1975 | Stanback |
| 3,963,322 | A | 6/1976 | Gryctko |
| 4,199,216 | A | 4/1980 | Gryctko |
| 4,502,825 | A | 3/1985 | Yamada |
| 5,429,466 | A | 7/1995 | Nagayama |
| 5,494,462 | A | 2/1996 | Auclair |
| 5,713,705 | A | 2/1998 | Grunbichler |
| 6,032,556 | A | 3/2000 | Hu |
| 6,884,124 | B1 | 4/2005 | Luzzi |
| 7,214,108 | B2 | 5/2007 | Barnett |
| 7,387,547 | B1 | 6/2008 | Fuzetti |
| 7,758,356 | B2 | 7/2010 | Burris et al. |
| 7,775,754 | B2 | 8/2010 | Calandra et al. |
| 8,317,443 | B2 | 11/2012 | Stauch et al. |
| 2009/0053940 | A1 | 2/2009 | Sweeney et al. |
| 2009/0075526 | A1 | 3/2009 | King, Jr. et al. |

(Continued)

FOREIGN PATENT DOCUMENTS

WO   2014000881   1/2014

OTHER PUBLICATIONS

PCT/US2015/053604 International Search Report and Written Opinion dated Dec. 22, 2015.

*Primary Examiner* — Harshad Patel
(74) *Attorney, Agent, or Firm* — Michael Best & Friedrich, LLP

(57) ABSTRACT

A fastener includes a head, a shaft, and a pressure pad. The head has an outer surface for engaging a drive tool. The shaft has an outer surface including a threaded portion. The pressure pad has a breakaway portion with a torque limit connecting the pressure pad to the shaft.

17 Claims, 4 Drawing Sheets

(56) References Cited

U.S. PATENT DOCUMENTS

2009/0169324 A1* 7/2009 Fritsch ..................... F16B 5/02
  411/4
2012/0276789 A1 11/2012 Battle
2012/0328388 A1 12/2012 Hardt et al.

* cited by examiner

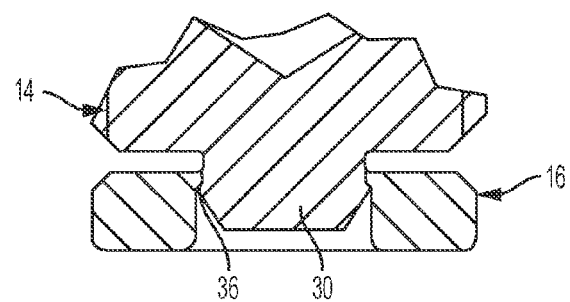
FIG. 5
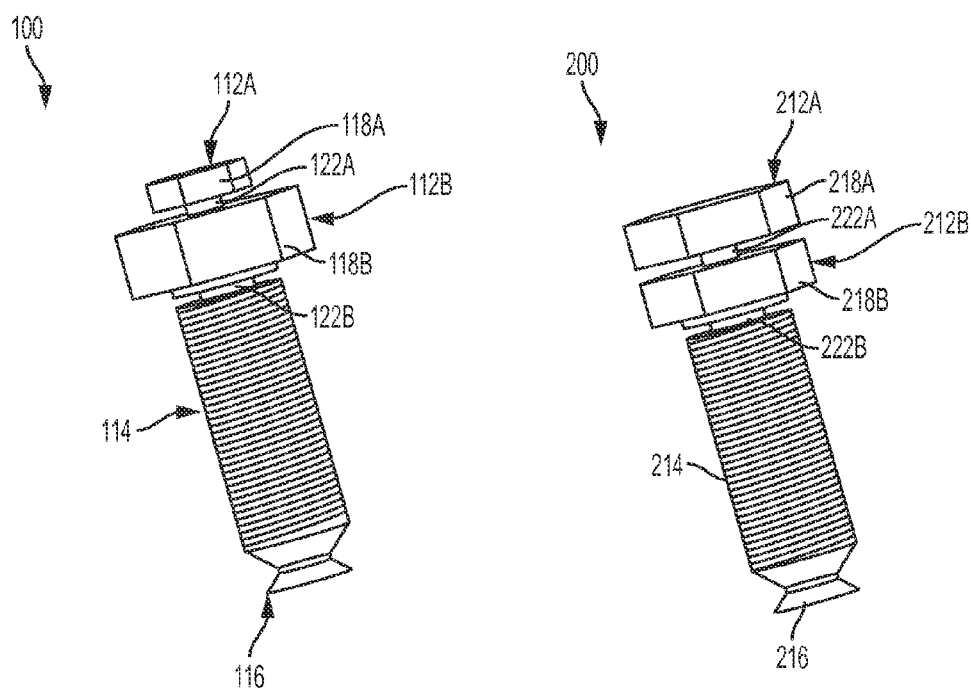
FIG. 6
FIG. 7

BREAKAWAY PRESSURE SCREW

RELATED APPLICATIONS

This application is based on provisional application Ser. No. 62/058,307, filed Oct. 1, 2014, the disclosure of which is incorporated herein by reference in its entirety.

FIELD

Various exemplary embodiments discussed herein are directed to shearable fasteners having one or more breakaway features.

BACKGROUND

Electrical connectors are used in a variety of environments to connect and transfer electrical power to or from one or more conductors. A primary and one or more tap conductors is physically and electrically connected to a structure, such as a distribution block, terminal lug, splice, or other connector. Power is transferred between the primary conductor and the tap conductors. Certain connectors utilize a fastener to provide a compression force to attach and retain a conductor.

SUMMARY

According to an exemplary embodiment, a fastener includes a head, a shaft, and a pressure pad. The head has an outer surface for engaging a drive tool. The shaft has an outer surface including a threaded portion. The pressure pad has a breakaway portion with a torque limit connecting the pressure pad to the shaft.

According to another exemplary embodiment, a fastener includes a first head and a second head. A shearable section is positioned between the first head and the second head. A shaft has an outer surface including a threaded portion connected to the second head. The pressure pad has a breakaway portion with a torque limit connecting the pressure pad to the shaft.

According to another exemplary embodiment, an electrical connector includes a body having a first aperture for receiving a conductor and a second aperture having a thread for receiving a fastener. A fastener is positioned in the second aperture. The fastener has a head with a surface for engaging a drive tool, a shaft with an outer surface including a threaded portion, and a shearable section positioned between the head and the shaft. The shearable section has a first torque limit. A pressure pad is connected to the shaft by a breakaway portion having a second torque limit.

Further exemplary embodiments include a method of securing a conductor to an electrical connector. A conductor is placed into a first aperture of an electrical connector having a fastener positioned in a second aperture. The fastener includes a head having a surface for engaging a drive tool, a shaft having a threaded portion, a shearable section positioned between the head and the shaft having a first torque limit, and a pressure pad having a breakaway portion with a second torque limit connecting the pressure pad to the shaft. The fastener is rotated until the second torque limit is reached, fracturing the breakaway portion and allowing the pressure pad to rotate with respect to the shaft. The fastener is further rotated until the first torque limit is reached, separating the head from the shaft.

BRIEF DESCRIPTION OF THE DRAWINGS

The aspects and features of various exemplary embodiments will be more apparent from the description of those exemplary embodiments taken with reference to the accompanying drawings, in which:

FIG. 5 is a partial sectional view of the screw shown in FIG. 1 with the pressure pad sheared from the shaft;

FIG. 6 is a perspective view of another exemplary embodiment of a breakaway screw with first and second shearable heads;

FIG. 7 is a perspective view of another exemplary embodiment of a breakaway screw with first and second shearable heads;

DETAILED DESCRIPTION OF EXEMPLARY EMBODIMENTS

Figure 1:
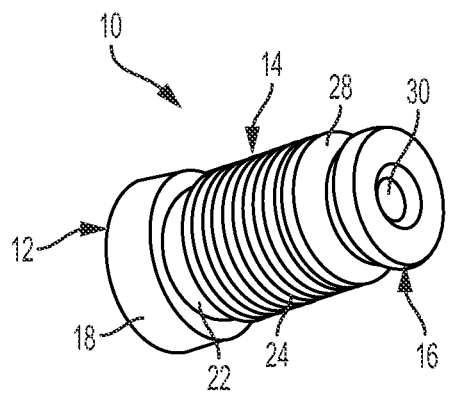
FIG. 1 is a perspective view of an exemplary breakaway screw.

An electrical connector may utilize a fastener to attach and retain a conductor. Examples of such connectors may include, but are not limited to, distribution blocks that receive one or more primary conductors and one or more tap conductors and lug connectors having an opening for receiving a conductor and a pad for attaching the connector to a structure. These connectors have one or more openings to receive the conductors and utilize a fastener extending into the opening to connect and retain the conductor. Proper attachment of the conductor provides a secure connection and efficient electrical power transfer.

As best shown in FIGS. 1-4, and in accordance with various exemplary embodiments, a fastener 10 includes a head 12, a shaft 14, and a pressure pad 16. The fastener 10 is depicted as an integral structure although the head 12, shaft 14, and pressure pad 16 may be made of different components that are connected or attached to one another. Any suitable process or machining may be used to form the fastener 10, for example through molding or casting and any suitable material may be used, for example metal. The fastener 10 may be rated for use with various conductors, for example aluminum and copper conductors.

The head 12 has a head outer surface 18 and a head inner surface 20. Both, or one of, the head outer and inner surfaces 18, 20 are designed to mate with a tool, for example a driver or wrench. In the exemplary embodiment shown in FIG. 2, the head inner surface 20 is a socket designed to receive a hex or Allen type wrench or driver, although the fastener 10 can be configured to work with any type of socket and tool combination.

The head 12 is integrally or otherwise connected to the shaft 14 by a shearable section 22. The shearable section 22 is a weakened area compared to the head 12 and the shaft 14 and is designed to rupture, allowing the head 12 to separate from the shaft 14 when a certain rotational torque limit is reached substantially relative to the longitudinal axis of the screw. In an exemplary embodiment, the shearable section 22 is weakened due to a reduced wall thickness. The reduced wall thickness may be formed through machining such as, but not limited to, milling, turning, laser etching, etc. The reduced wall thickness may also be formed through a molding or casting process. The diameter and wall thickness of the shearable section 22 can be altered depending on the material of the fastener 10 and the desired torque limit. The size or strength of the shearable section 22 is dependent on the application of the screw and desired torque limit and begins to shear upon application of torque exceeding the torque limit. The inner surface of the shearable section 22 may be continuous with the head inner surface 20, having the same size and shape, or it may have a different configuration, such as a smooth cylindrical surface.

In various alternative embodiments, the shearable section 22 includes a frangible connection formed by openings, perforations, or deformations. More than one shearable section 22 may also be provided to allow shearing of the fastener at different lengths. Multiple shearable sections 22 can also have different torque limits.

The shaft 14 includes a shaft outer surface 24, a shaft inner surface 26, a shaft bottom surface 28, and a protrusion 30. The shaft outer surface 24 includes a threaded portion. In various exemplary embodiments, the shaft inner surface 26 can include a surface designed to mate with a tool, for example a socket designed to mate with a hex wrench. In an exemplary embodiment, the shaft inner surface 26 is sized or configured differently from the head inner surface 20. The shaft inner surface 26 can also be configured to mate with a different tool.

In an exemplary embodiment, the pressure pad 16 has a substantially circular cross-section and is rotatably connected to the shaft 14 protrusion 30. The pressure pad 16 has a bottom surface for contacting the conductor as the fastener 10 is tightened. When the friction between the pressure pad 16 and the conductor overcomes the friction in the rotatable connection between the pressure pad 16 and the protrusion 30, the shaft 14 rotates independently of the pressure pad 16 which does not rotate with respect to the conductor. The independently rotatable pressure pad 16 helps prevent the fastener 10 from grinding into the conductor and damaging individual conductor strands, especially when used with flex conductors.

Figure 2:
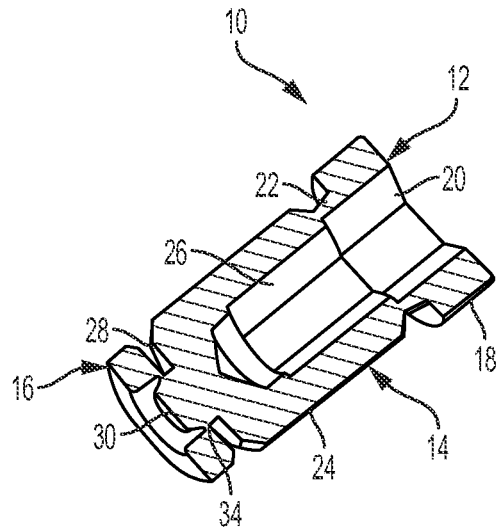
FIG. 2 is a sectional view of FIG. 1 taken along a plane extending along the longitudinal axis of the screw.
Figure 3:
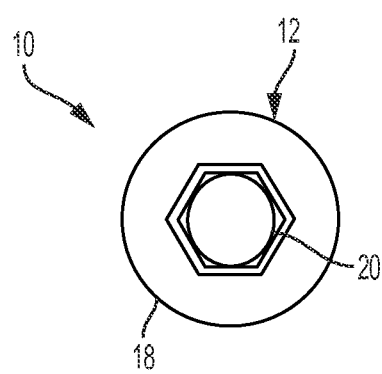
FIG. 3 is top view of the screw shown in FIG. 1.
Figure 4:
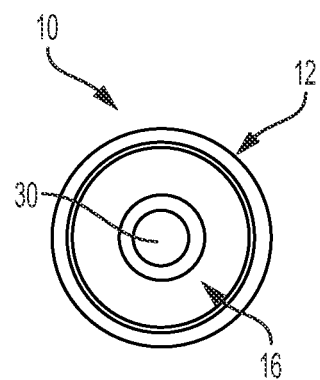
FIG. 4 is a bottom view of the screw shown in FIG. 1.

In an exemplary embodiment, the pressure pad 16 is initially rotationally fixed to the shaft through a breakaway portion 34. The breakaway portion 34 is a weakened area compared to the pressure pad 16 and the protrusion 30 and is designed to rupture when a certain torque limit is reached, allowing the pressure pad 16 to rotate freely with respect to the shaft. In various exemplary embodiments, a weakened area, shearable section or other frangible connection is used to form the breakaway portion 34. As best shown in FIG. 2, the exemplary breakaway portion 34 is an area of reduced thickness forming a web connecting the pressure pad 16 to the protrusion 30. The reduced thickness may be formed through machining such as, but not limited to, milling, turning, laser etching, etc. The reduced thickness may also be formed through a molding or casting process. The diameter and wall thickness of the breakaway portion 34 can be altered depending on the material of the fastener 10 and the desired torque limit. In various alternative embodiments, the breakaway portion 34 includes a frangible connection formed by openings, perforations, or deformations.

In exemplary embodiments utilizing a breakaway portion 34, the pressure pad 16 rotates with the head 12 and shaft 14 until a predetermined torque limit is reached. After the torque limit is surpassed, the breakaway portion 34 ruptures and the pressure pad 16 separates from the shaft protrusion 30. As best shown in FIG. 5, a burr 36 is created on the protrusion 30 that prevents the pressure pad 16 from fully detaching from the fastener 10 but allows it to freely rotate. The head 12 and shaft 14 are then tightened further, increasing the downward pressure on the conductor, with minimal or no rotation of the pressure pad 16 with respect to the conductor. The free rotation of the pressure pad 16 with respect to the shaft 14 assists in preventing damage to the conductors, for example through crushing, splaying and breaking of the conductors that could cause an inferior connection.

Use of the shearable portion 22 and the breakaway portion 34 allows a user to form a secure connection while helping to prevent over tightening. The fastener 10 also eliminates the need to use special torque wrenches to prevent over tightening in a specific application. The torque limit of the shearable portion 22 and the breakaway portion 34 can be set for different sizes and types of conductors.

FIGS. 6-10, depict exemplary embodiments where the fastener has more than one shearable head. Multiple heads allows multiple torque settings to be built into a single fastener. For example, a #12 AWG flex conductor requires a 30 ft/lb installation torque, while a #4 AWG flex conductor requires a 40 ft/lb installation torque. To accommodate both #12 and #4 conductors, a fastener can include a first head that is shearable at 30 ft/lb and a second head that is shearable at 40 ft/lb. These values are meant as non-limiting examples, as any combination of torque limit values may be used depending on the associated conductors.

FIG. 6 depicts an exemplary embodiment of a fastener 100 having a double breakaway feature with a first head 112A, a first shearable portion 122A, a second head 112B, and a second shearable portion 122B. The first head 112A is smaller than the second head 112B, and is therefore designed to mate with a different sized tool. The first and second heads 112A, 112B have respective outer surfaces 118A, 118B designed to mate with a tool, for example a wrench. In an exemplary embodiment the first and second shearable portions 122A, 122B are configured to have different torque limits, for example the first shearable portion 122A has a torque limit less than the second shearable portion 122B. The torque limit of the first and second shearable portions 122A, 122B can also be substantially equal. In various exemplary embodiments, the first and second heads 112A, 112B can be solid or have an inner surface (not shown). The inner surface can be designed to mate with a tool, for example a hex wrench. The outer and inner surfaces can have any combination of plain surfaces or tool engaging configurations.

FIG. 7 depicts an exemplary embodiment of a fastener 200 having a double breakaway feature with a first head 212A, a first shearable portion 222A, a second head 212B, and a second shearable portion 222B. The first and second heads 212A, 212B are approximately the same size and have respective outer surfaces 218A, 218B designed to mate with a tool, for example a wrench. In an exemplary embodiment the first and second shearable portions 222A, 222B are configured to have different torque limits, for example the first shearable portion 222A has a torque limit less than the second shearable portion 222B. The torque limit of the first and second shearable portions 222A, 222B can also be substantially equal. In various exemplary embodiments, the first and second heads 212A, 212B can be solid or have an inner surface (not shown). The inner surface can be designed to mate with a tool, for example a hex wrench. The outer and inner surfaces can have any combination of plain surfaces or tool engaging configurations.

Figure 8:
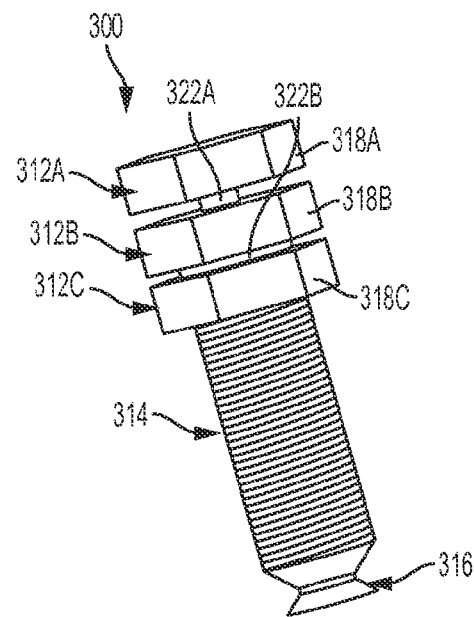
FIG. 8 is a perspective view of another exemplary embodiment of a breakaway screw with first and second shearable heads and a third head.

FIG. 8 depicts an exemplary embodiment of a fastener 300 having a double breakaway and removal feature with a first head 312A, a first shearable portion 322A, a second head 312B, a second shearable portion 322B, and a third head 312C. The first, second, and third heads 312A-312C are approximately the same size. The first, second, and third heads 312A-312C have respective outer surfaces 318A-318C designed to mate with a tool, for example a wrench. In an exemplary embodiment the first and second shearable portions 322A, 322B are configured to have different torque limits, for example the first shearable portion 322A has a torque limit less than that of the second shearable portion 322B. The torque limit of the first and second shearable portions 322A, 322B can also be substantially equal. In various exemplary embodiments, the first, second, and third heads 312A-312C can be solid or have an inner surface designed to mate with a tool, for example a hex wrench. The outer and inner surfaces can have any combination of plain surfaces or tool engaging configurations.

Figure 9:
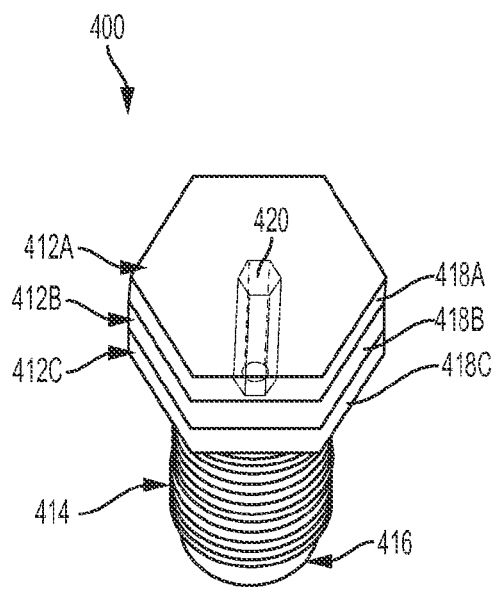
FIG. 9 is a perspective view of another exemplary embodiment of a breakaway screw with first, second, and third shearable heads.
Figure 10:
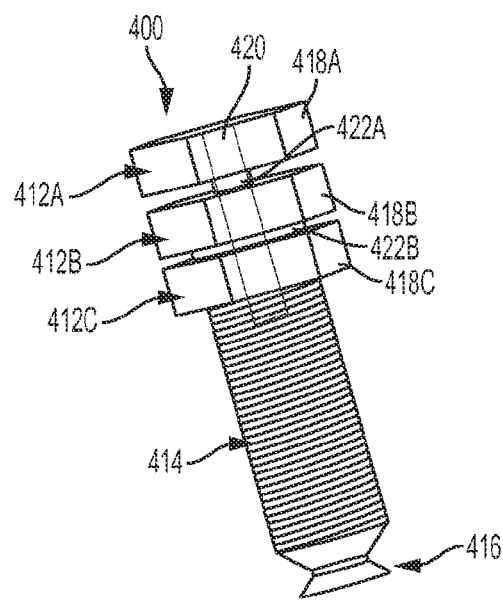
FIG. 10 is another perspective view of the screw shown in FIG. 9.

FIGS. 9 and 10 depict an exemplary embodiment of a fastener 400 having a triple breakaway feature with a first head 412A, a first shearable portion 422A, a second head 412B, a second shearable portion 422B, a third head 412C, and a third shearable portion 422C. The first, second, and third heads 412A-412C are approximately the same size and have respective outer surfaces 418A-418C designed to mate with a tool, for example a wrench. In an exemplary embodiment, an inner surface 420 extends through the first, second, and third heads 412A-412C, through the first, second, and third shearable portions 422A-422C, and into the shaft 414. The inner surface 420 can be designed to mate with a tool, for example a hex wrench. The first, second, and third shearable portions 422A-422C are configured to have different torque limits. In an exemplary embodiment, the first shearable portion 422A has a torque limit less than the second shearable portion 422B and the second shearable portion 422B has a torque limit less than the third shearable portion 422C. The hexagonal inner surface 420 allows the fastener 400 to be removed even after the first, second, and third heads 412A-412B have been separated from the shaft 414.

Figure 11:
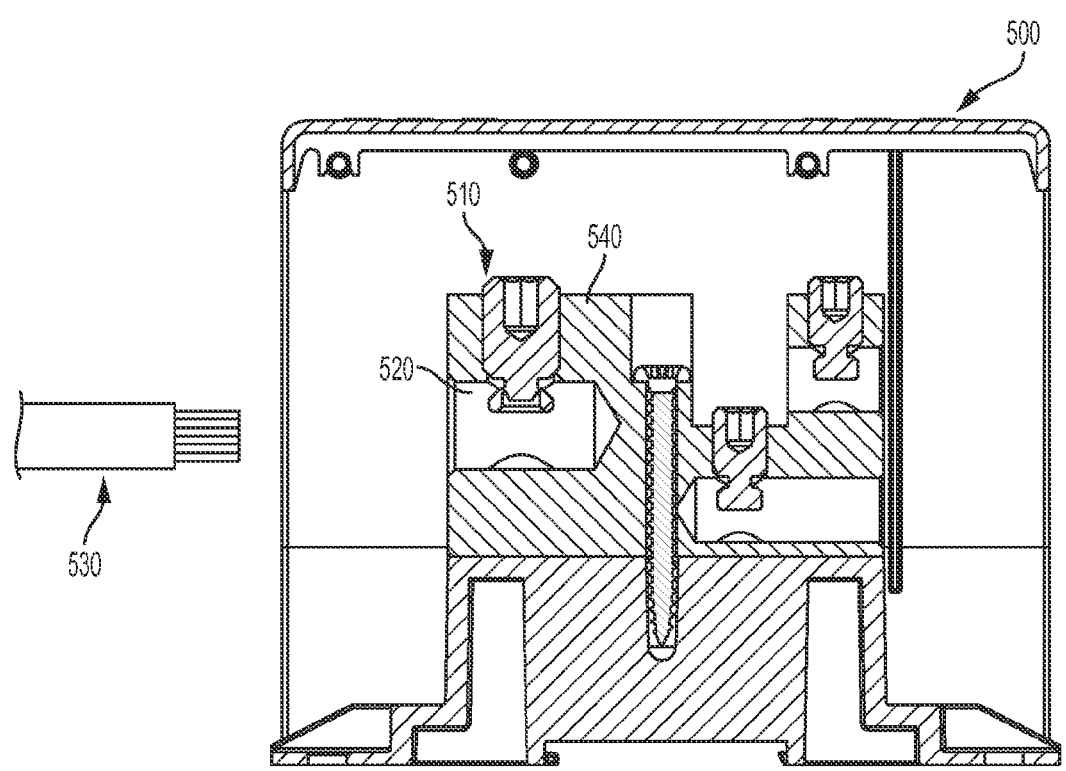
FIG. 11 is a side, sectional view of an exemplary conductor block with a pressure pad screw and a conductor.

FIG. 11 depicts an exemplary embodiment of a connector block 500 utilizing one or more pressure pad screws 510. The pressure pad screw 510 can have any combination of a shearable portion, a breakaway portion, and one or more of the additional features described herein. The connector block 500 includes a first aperture 520 for receiving a conductor 530. The pressure pad screw 510 is threadably connected to a second aperture 540 and is tightened to retain the conductor 530 in the first aperture 520.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A fastener comprising:
a head having an outer surface for engaging a drive tool;
a shaft having an outer surface including a threaded portion; and
a pressure pad having a breakaway portion with a torque limit connecting the pressure pad to the shaft,
wherein the pressure pad is rotatably fixed to the shaft prior to the torque limit being exceeded and the pressure pad is rotatably connected to the shaft after the torque limit is exceeded.

2. The fastener of claim 1, further comprising a shearable section positioned between the head and the shaft having a second torque limit.

3. The fastener of claim 2, wherein the second torque limit is greater than the first torque limit.

4. The fastener of claim 1, wherein the breakaway portion forms a burr on the shaft after the torque limit has been exceeded.

5. The fastener of claim 1, wherein the head comprises a hexagonal outer surface.

6. The fastener of claim 1, wherein the head is a first head and the fastener further comprises a second head and a shearable section positioned between the first head and the second head.

7. The fastener of claim 6, wherein the first head is smaller than the second head.

8. The fastener of claim 6, further comprising a second shearable section positioned between the second head and the shaft.

9. The fastener of claim 6, further comprising a third head positioned between said second head and said shaft.

10. The fastener of claim 9, further comprising a third shearable portion positioned between the third head and the shaft.

11. The fastener of claim 10, wherein a socket extends through the first, second, and third heads, and into the shaft.

12. The fastener of claim 6, wherein the first and second heads have an outer surface for engaging a drive tool.

13. The fastener of claim 6, wherein the first and second heads have an inner surface for receiving a drive tool.

14. The fastener of claim 6, wherein the shaft has an inner surface for receiving a drive tool.

15. An electrical connector comprising:
a body having a first aperture for receiving a conductor and a second aperture having a thread for receiving a fastener; and
a fastener positioned in the second aperture including a head having a surface for engaging a drive tool, a shaft having an outer surface including a threaded portion, a shearable section positioned between the head and the shaft having a first torque limit, and a pressure pad having a breakaway portion with a second torque limit connecting the pressure pad to the shaft, wherein the pressure pad is rotatably fixed to the shaft prior to the torque limit being exceeded and the pressure pad is rotatably connected to the shaft after the torque limit is exceeded.

16. The electrical connector of claim 15, wherein the pressure pad is rotatably fixed to the shaft prior to the torque limit being exceeded and the pressure pad is rotatably connected to the shaft after the torque limit is exceeded.

17. The electrical connector of claim 15, further comprising a second head and a second shearable section positioned between the first head and the second head.

* * * * *